May 31, 1966 R. W. THOMAS 3,253,419
BATCH FRACTIONAL CRYSTALLIZATION AND PURIFICATION
Filed April 29, 1963

INVENTOR.
R.W. THOMAS
BY
Young and Quigg
ATTORNEYS

United States Patent Office 3,253,419
Patented May 31, 1966

3,253,419
BATCH FRACTIONAL CRYSTALLIZATION AND
PURIFICATION
Rosswell W. Thomas, Bartlesville, Okla., assignor to
Phillips Petroleum Company, a corporation of Delaware
Filed Apr. 29, 1963, Ser. No. 276,226
1 Claim. (Cl. 62—58)

This invention relates to batch fractional crystallization and purification. In one aspect the invention relates to the separation of at least one component from a liquid mixture by fractional crystallization in a combination crystallization and purification zone.

The separation of chemical compounds by means of crystallization finds many applications in industrial installations. While many separations can be made by distillation or solvent extraction, there are instances where these methods are either impractical or impossible and desired separation can be effected more advantageously by means of crystallization. Thus, in the case of chemical isomers having similar boiling points, insolubilities, or materials having relatively high boiling ranges or thermally unstable substances, separation by crystallization may be the only method which can be advantageously employed.

As well as often being the only practical method of separation, the crystallization method offers a further advantage of being the only known separation method which, in the case of eutectic-forming systems, theoretically produces a pure product in a single stage of operation. In actual practice, however, the crystals obtained from a solution of several components will be impure because of the occlusion of mother liquor within the crystal interstices. In the conventional fractional crystallization processes, the crystals yielded from one batch crystallization are redissolved in a solvent or remelted and again recrystallized to effect further purification. The recrystallized product will contain fewer impurities since the concentration of impurities in the new liquor is less than in the previous liquor crystallization.

More recently, a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification zone, such as centrifuges, filters, and the like. In this zone, crystals are separated from the mother liquor, sometimes washed, and then introduced into a melting zone where the crystals are melted and the melt is withdrawn as product.

The above-described conventional methods require transportation of the crystal slurry from the freezer to the purification unit. Conventional means cannot transport a slurry containing more than about 50 percent crystals, since a concentration of the level or more has a consistency close to that of a solid mass. In many cases, e.g., the concentration of beer, it is desired to remove about 85 percent of the water from the beer by freezing said water to ice and then removing said ice crystals from the concentrate. Since only 50 percent of the water can be frozen in order to transport the resultant slurry, more than one stage of crystallization is required. Only one stage would suffice, however, if 85 percent of the water could be frozen out and the resultant crystals separated from the concentrate. It would be advantageous to have a method and apparatus wherein it is unnecessary to move the crystal bed.

It is an object of this invention to provide a method for the crystallization and purification of a liquid mixture.

It is another object of the invention to provide a method for the purification of a bed of crystals without moving the crystals.

These and other objects of the invention will be readily apparent to those skilled in the art from the accompanying disclosure, claim and drawing.

These objects are accomplished in a batch process employing a single vessel for the separation of at least one component from a liquid mixture by crystallization comprising cooling said mixture to form a bed of crystals, purifying said crystals in place, and melting said crystals to obtain a purified product.

In one aspect of the invention, the crystals are formed by direct heat exchange with a liquid refrigerant which is thereby vaporized with said vapor subsequently being used to purify and melt the crystal bed.

In another aspect of the invention, the crystal bed is flushed with cool refrigerant vapor to remove adherent mother liquor, then warmer refrigerant vapor is passed therethrough to melt a portion of the crystals with the melt being forced by the vapor through the crystal bed to wash any occluded liquid therefrom, and finally the refrigerant vapor is heated and passed through the crystal bed at a temperature sufficient to melt the crystals.

In yet another embodiment, the bed of crystals is washed with crystal melt, either formed in situ or from a similar bed of crystals, and the wash liquid is removed. The above wash and removal is continued or the steps are repeated until analysis of wash liquid indicates that the remaining crystals have the desired purity.

The process and apparatus described herein can be advantageously employed in conjunction with practically any system to which fractional crystallization is applicable. For simplification, the invention is described herein primarily with reference to an aqueous mixture. However, the process and apparatus of the invention are applicable to a vast number of simple binary and complex multi-component systems. The invention is particularly applicable to the separation of hydrocarbons which have practically the same boiling point and are, therefore, difficult to separate by distillation. The invention is broadly applicable to the purification of any liquid such as those described in the patent to Rosswell W. Thomas, U.S. 2,854,494, which is incorporated by reference herein.

The invention is best illustrated by reference to the accompanying drawings.

Figure 1:
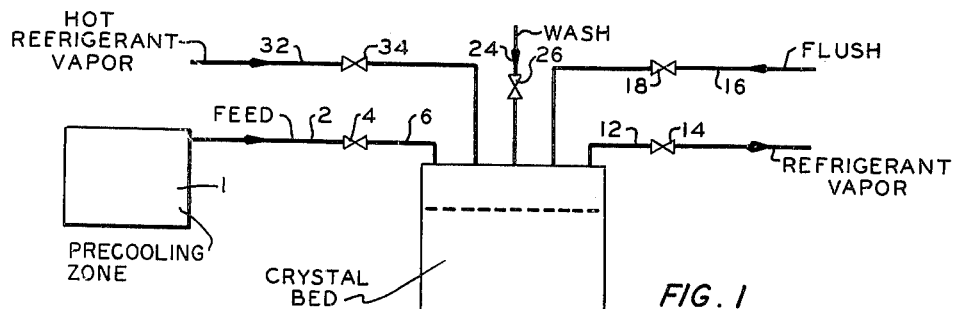
FIGURE 1 is a diagrammatic illustration of a single batch cooling and purification zone.

In FIGURE 1, a feed passes through precooling zone 1, conduit 2, valve 4, and conduit 6 into a combination batch cooling and purification zone 8. The liquid mixture may be cooled to form crystals within said zone by any suitable method such as by direct refrigeration, indirect refrigeration, or the like. In addition, it is within the scope of the invention to partially freeze in the precooling zone 1 the feed stock externally of the cooling zone 8 by a scraped surface freezer, or the like, and then pass the resultant slurry into tank 8. The slurry is then frozen to a higher solids content within the tanks. Another suitable external freezing method would be a rotating drum freezer wherein the feed stock is frozen to the desired solids content on the external surface of a revolving drum, on the inside of which refrigerant is circulated. The solids are scraped from the drum and passed to the purifying tanks for additional freezing, if desired, compacting, if desired, and subsequent purification. It is also frequently desirable to employ indirect refrigeration, for example, there may be employed one or more tanks which incorporate heat exchange surfaces on the walls or heat exchange tubes may be inserted within the tanks. The feed stock is frozen to the desired solids content by passage of refrigerant through the heat exchangers. Direct refrigeration may also be used simultaneously or alternately with this method. A preferred method is by direct refrigeration within said tank 8 by filling with feed stock to the desired level and introducing a liquid, immiscible refrgerant through conduit 10, preferably through the bottom portion of tank 8 through a screen or sparger. Suitable refrigerants include ethane, butane, propane, $CO_2$, Freon, and the like. The refrigerant passes upwardly through the liquid mixture and vaporizes in direct contact with the feed stock, thereby converting the feed stock to the desired solids content. Preferably, the solids content will be in the range of 20 to 85 weight percent. The refrigerant vapors are removed overhead through conduits 12 and valve 14. The freezing step may be followed by a compacting step, if desired, where the crystal mass is compressed by the application of a force such as a descending piston or the like. This step helps to eliminate voids and reduces channelling of the wash liquid.

At the conclusion of the freezing step, valves 4, 11 and 14 are closed and the crystal bed is then flushed with a suitable fluid to remove adherent mother liquor. This fluid may include any immiscible non-deleterious liquid or gas which is introduced through conduit 16 and valve 18 and the adherent mother liquor and flush fluid are removed through conduit 20 and valve 22. Preferably the flush fluid is a gas so as not to dilute the mother liquor. For example, this flush step may comprise passing the refrigerant vapor through the conduits as hereinbefore described with the vapor being relatively cold so as to not melt any of the crystal bed.

The crystal bed is then washed by suitable fluid passing through conduit 24 and valve 26 through the crystal bed and then out through conduit 28 and valve 30. This wash step is to remove any occluded, trapped liquid which may have been missed in the flushing step. Preferably, the wash will be continued until the liquid removed through valve 30 indicates, upon analysis, that the crystals have attained the desired purity. Again, this wash fluid may be an inert gas or water or other suitable fluid. Preferably, the wash fluid is readily separable from the mother liquor. A suitable fluid includes the refrigerant vapor. The fluid may also consist of crystal melt either formed in situ due to the temperature of the wash fluid or melt from a similar bed of crystals. The temperature is sufficiently low to prevent melting any substantial portion of the crystal bed. If desired, the flow of wash fluid to the tank may be pulsed so as to improve the washing efficiency. In other words, pressure may be applied to the wash fluid on an intermittent schedule so as to produce waves of the wash fluid in the crystal bed. In one suitable method of operation, refrigerant vapors are passed through the crystal bed, first to purge occluded uncrystallized liquid, next at a temperature sufficient to melt sufficient crystals to furnish wash liquid and force same through the remaning crystals and finally at an elevated temperaure to melt the crystals in situ. These vapors may be heated by any suitable means including compression or direct and indirect exchange. A preferred method is by compressing the gas to elevate the temperature and to provide sufficient pressure to force the vapors through the crystal bed as well as sufficient pressure to permit the fluid to condense within the crystal bed during the melting step.

With the crystal bed purified, the crystal bed is then melted by any suitable means such as direct or indirect heat exchange. One method comprises passing hot refrigerant vapor through conduit 32, valve 34, through the crystal bed and out through conduit 36, valve 38 and conduit 40 into tank 41. The liquid removed through conduit 36 is a mixture of the condensed refrigerant and the crystal melt. Within tank 41 the mixture is allowed to separate into two phases due to their mutual immiscibility and density differential (or by any other suitable liquid-liquid separation means) to provide phase 42 which contains the liquid refrigerant and phase 44 containing the product. These phase positions may be reversed if the specific gravities are reversed so that the refrigerant is on the bottom. The product is then withdrawn through conduit 46 and valve 48. The condensed refrigerant may then be removed and returned to the liquid refrigerant feed system through conduit 50, valve 52, and conduit 54 into the feed conduit 10, with valve 11 closed.

One advantage of the invention is that the transporting of solids from the final stage freezer to the purification column is avoided, thus permitting freezing of the feed stock to be desired solids content without concern about difficulty of transporting a relatively solid mass. Another advantage is that energy is conserved by the use of a heat pump cycle whereby heat removed from the freezing cycle is used subsequently to melt crystals in the melting cycle. The invention has particular applicability to separating completely or partially one material that can be frozen in the presence of another material or materials which are not frozen under the conditions selected for these and other materials. Either the crystallized material or the unfrozen mother liquor or both may be the desired product. Separation may be partial or as complete as is desired. One application is the removal of some or a high percentage of water from fruit juices, beverages, or other water-containing mixtures. Another is the removal of salts and dissolved minerals from brackish or sea water. Another use is the separation of chemicals. The separations are effected by freezing-melting point differences in the materials to be separated. The operation may be conducted in any range of temperatures needed for the separation to be accomplished, from cryogenic temperature levels to levels where normally solid materials are melted or partially melted.

In some applications, it may be desirable to add an antifreeze liquid to the wash liquid in order to prevent freezing of the wash fluid in the crystal bed.

It is also within the scope of the invention to add an immiscible liquid, such as mercury or gasoline, to the freeze zone prior to filling the tank. The liquid is then drained after freezing to leave a space at the bottom of the bed for easy draining of the wash fluids and crystal melt.

Figure 2:
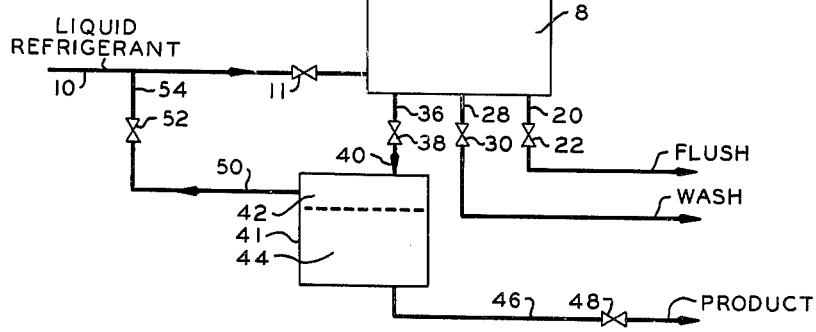
FIGURE 2 is a flow diagram representing one aspect of the invention wherein one crystal bed is being formed with a liquid refrigerant in direct heat exchange while a second crystal bed is being purified with the same refrigerant in a vaporous state.
Figure 2:
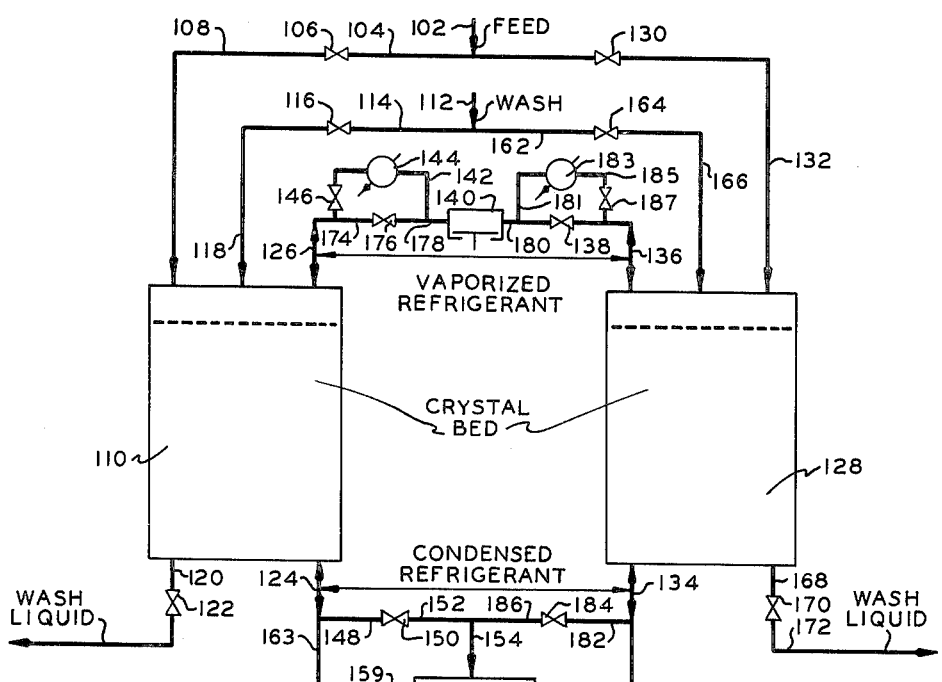

In FIGURE 2, a particularly preferred method of operation is described wherein two tanks are alternately employed for the alternate freezing and purification of liquid mixtures and crystals, respectively. A multi-component feed mixture is fed through conduits 102, 104, valve 106 and conduit 108 into a combination batch cooling and purification zone 110. When the zone has been filled to the desired level, valve 106 is closed and a liquid refrigerant is introduced, preferably into the lower portion, of zone 110 through conduit 124 and passes upwardly through the liquid mixture so as to crystallize the crystallizable components and form a crystal bed. The refrigerant is thereby vaporized and is removed from an upper portion of the vessel through conduit 126. A flush fluid is then introduced through conduits 112, 114, valve 116 and conduit 118 into the crystal bed and forced therethrough to remove occluded mother liquor through conduits 120, valve 122. This flush is then followed by a wash fluid which may be any wash fluid as hereinbefore described. For simplicity, the flush and wash fluid are shown as passing through the same conduits although separate conduits may be provided.

Meanwhile in tank 128 a similar crystal bed has been formed with the feed introduced through conduit 102, valve 130 and conduit 132 being partially crystallized in tank 128 by a liquid refrigerant from conduit 134. The thus vaporized refrigerant leaves the tank through conduit 136, valve 138 and is compressed by compressor 140. For simplification, this is shown as a single compressor. It is believed obvious a dual manifold compressor or a plurality of compressors can be employed. If necessary to maintain the proper heat balance, the compressed fluid from compressor 140 is passed through conduit 142, heat exchanger 144, valve 146 and conduit 126. This compressed, heated fluid is then passed down through the crystal bed in zone 110 to melt the crystals. The vaporized refrigerant may also be used in the flushing and washing step. The mixture of crystal melt and liquid refrigerant is removed through conduits 124, 148, valve 150, and conduits 152 and 154 into vessel 156. Within vessel 156 the product is separated from the liquid refrigerant and removed through conduit 158. The liquid refrigerant is then used to crystallize the liquid mixture contained in tank 128 and passes through conduits 160 and 134 through the liquid mixture, as hereinbefore described for vessel 110. The crystal bed is then subsequently flushed and washed by fluids passing through conduits 112, 162, valve 164 and conduit 166. The wash fluid containing occluded mother liquor is removed through conduit 168, valve 170 and conduit 172. The vaporized refrigerant removed from zone 110 through conduit 126 is then passed in the opposite direction than that described for the melting step for zone 110 through conduit 174, valve 176 and conduit 178 into compressor 140 wherein it is compressed and heated as hereinbefore described. After adjustment to the proper temperature by passage through conduits 180, 181, heat exchanger 183, conduit 185, valve 187 and conduit 136, the compressed heated fluid passes through the crystal bed in zone 128 to melt the bed of crystals. The crystal melt is removed along with the condensed refrigerant through conduits 134, 182, valve 184, conduits 186 and 154 into the vessel 156 wherein it is separated as hereinbefore described. The refrigerant is removable through conduit 159, valve 161, valve 161 and conduits 163, 124 for cooling the liquid mixture in zone 110 as hereinbefore described. By this method it is thus possible to employ two or more zones in such a manner as to substantially continuously produce product using the same refrigerant both for freezing the crystal bed and for melting the crystal bed. In addition, the same refrigerant can be used, by additionally controlling the temperature of the vaporized refrigerant or the temperature of the fluid after compression, for both the flush and wash steps, as well as for the melting steps.

The temperature, volume and pressure of the fluid employed in the flushing, washing and melting steps is dependent upon the crystal bed and the size thereof.

The invention is best illustrated by the following example.

EXAMPLE

A feed comprising 700 gallons of sea water containing 3 weight percent salt is passed into a batch crystallization-purification tank having a diameter of 4 feet and a height of 10 feet. Temperature of the water is 70° F. Liquid propane is sparged into the bottom of the tank and allowed to vaporize at 25 p.s.i.a. as it passes upward through the water. Evaporation of 5,200 pounds of propane results in freezing 75 percent of the water to ice crystals. Because of the high solids content, there is no free mother liquor to be flushed from the crystals so this step is omitted. Propane vapor from a similar tank of sea water being frozen is compressed to 100 p.s.i.a. and 100° F. and passed into the top of the first tank until sufficient ice has melted to form 200 gallons of wash liquid. This requires 1,300 pounds of warm propane vapor. Additional propane vapor at 33° F. is then passed into the tank. This cold vapor pushes the wash liquid downward through the crystal bed, thereby purifying the remaining crystals of occluded salt water. There finally issues from the bottom of the tank about 200 gallons of aqueous wash containing about 10.5 percent salt. An additional 3,300 pounds of hot propane vapor at 100° F. and 100 p.s.i.a. is then passed into the tank to totally melt the remaining purified crystals to form 500 gallons of purified water containing less than 500 p.p.m. salt.

While certain examples, structures, compositions and process steps have been described for purposes of illustration, the invention is not limited to these. Variation and modification within the scope of the disclosure and the claim can readily be effected by those skilled in the art.

I claim:

An in situ batch process for the separation of at least one component from a liquid mixture by crystallization comprising:

(A) cooling said liquid mixture in a first zone to form a bed of crystals by direct heat exchange with a liquid refrigerant which is vaporized thereby;

(B) compressing said vapor;

(C) passing part of the compressed vapor through a heat exchange zone to modify the temperature thereof to a desired level and then combining said part with a main part;

(D) concurrently melting crystals formed similarly as in step A in a second zone by passing the compressed vapors into said second zone thereby condensing the refrigerant;

(E) flushing the first zone of mother liquor;

(F) separating pure product from the refrigerant and passing the pure product as wash for the formed crystals in the first zone, flushing the pure product wash from the first zone, and (G) reversing the flow path of refrigerant as well as the function of the respective zones.

References Cited by the Examiner

UNITED STATES PATENTS

| 2,448,802 | 9/1948 | Holzcker | 62—58 |
| 2,862,824 | 12/1958 | Wenzelberger. | |
| 2,896,419 | 7/1959 | Thompson. | |
| 3,154,395 | 10/1964 | Stine | 62—58 |
| 3,170,778 | 2/1965 | Roth | 62—58 |
| 3,170,779 | 2/1965 | Karnofsky | 62—58 |

FOREIGN PATENTS

| 1,009,865 | 3/1952 | France. |
| 841,374 | 7/1960 | Great Britain. |
| 863,348 | 3/1961 | Great Britain. |
| 919,595 | 2/1963 | Great Britain. |

NORMAN YUDKOFF, *Primary Examiner.*